(12) United States Patent
Kim et al.

(10) Patent No.: US 11,193,323 B2
(45) Date of Patent: Dec. 7, 2021

(54) METHOD OF MANUFACTURING DOUBLE VACUUM GLASS AND DOUBLE VACUUM GLASS MANUFACTURED BY THE SAME

(71) Applicant: Mirex Co., Ltd., Seongnam-si (KR)

(72) Inventors: Jinbang Kim, Pocheon-si (KR);
Seokwoo Hong, Yongin-si (KR);
Sungjun Hong, Seongnam-si (KR)

(73) Assignee: MIREX CO., LTD., Seongnam-si (KR)

( * ) Notice: Subject to any disclaimer, the term of this patent is extended or adjusted under 35 U.S.C. 154(b) by 0 days.

(21) Appl. No.: 16/642,600

(22) PCT Filed: Jul. 1, 2019

(86) PCT No.: PCT/KR2019/007940
§ 371 (c)(1),
(2) Date: Feb. 27, 2020

(87) PCT Pub. No.: WO2020/005039
PCT Pub. Date: Jan. 2, 2020

(65) Prior Publication Data
US 2020/0347666 A1      Nov. 5, 2020

(30) Foreign Application Priority Data

Jun. 29, 2018  (KR) .................. 10-2018-0075445

(51) Int. Cl.
*E06B 3/673*     (2006.01)
*C03C 27/10*    (2006.01)
(Continued)

(52) U.S. Cl.
CPC .............. *E06B 3/673* (2013.01); *C03C 27/10* (2013.01); *E06B 3/6612* (2013.01);
(Continued)

(58) Field of Classification Search
CPC .... E06B 3/673; E06B 3/66304; E06B 3/6775; E06B 3/6736; E06B 3/6612; Y02B 80/22; Y02A 30/249
See application file for complete search history.

(56) References Cited

U.S. PATENT DOCUMENTS 1,370,974 A  *  3/1921  Kirlin ................... C03B 23/245
                                                                428/34
1,770,200 A  *  7/1930  Comstock ............... E04B 1/803
                                                                52/576
(Continued)

FOREIGN PATENT DOCUMENTS

CN         203474649 U      3/2014
JP         2000-226238 A    8/2000
(Continued)

*Primary Examiner* — Donald J Loney
(74) *Attorney, Agent, or Firm* — KORUS Patent, LLC; Seong Il Jeong

(57) ABSTRACT

Disclosed are a method of manufacturing double vacuum glass and double vacuum glass manufactured by the method. The double vacuum glass includes: a plate-shaped base panel configured to form one side surface of the double vacuum glass; a plate-shaped cover panel configured to form the other side surface of the double vacuum glass; spacers configured to space the base panel and the cover panel apart from each other so that a space is formed between the base panel and the cover panel; strip members configured to couple the base panel and the cover panel that are spaced apart from each other by the spacers; and a sealer configured to seal a space between the edges of the base panel and the edges of the cover panel by filling the space between the edges of the base panel and the edges of the cover panel outside the strip members.

8 Claims, 8 Drawing Sheets

(51) Int. Cl.
  *E06B 3/66* (2006.01)
  *E06B 3/663* (2006.01)
  *E06B 3/677* (2006.01)

(52) U.S. Cl.
  CPC ........ *E06B 3/66304* (2013.01); *E06B 3/6736* (2013.01); *E06B 3/6775* (2013.01)

(56) References Cited

U.S. PATENT DOCUMENTS

| | | | | |
|---|---|---|---|---|
| 4,928,448 A * | 5/1990 | Phillip | ................ | E06B 3/66304 52/179 |
| 6,399,169 B1 * | 6/2002 | Wang | ................ | E06B 3/66333 428/34 |
| 6,444,281 B1 * | 9/2002 | Wang | ................ | E06B 3/66304 428/34 |
| 8,821,999 B2 * | 9/2014 | Grzybowski | ....... | C03C 23/0025 428/34 |

FOREIGN PATENT DOCUMENTS

| | | | |
|---|---|---|---|
| KR | 10-2007-0087881 A | 8/2007 |
| KR | 10-1453305 B1 | 10/2014 |
| KR | 10-1606857 B1 | 3/2016 |
| KR | 10-2016-0123658 A | 10/2016 |
| KR | 10-1778535 B1 | 9/2017 |

* cited by examiner

METHOD OF MANUFACTURING DOUBLE VACUUM GLASS AND DOUBLE VACUUM GLASS MANUFACTURED BY THE SAME

TECHNICAL FIELD

The present invention relates generally to a method of manufacturing double vacuum glass and double vacuum glass manufactured by the method. More specifically, the present invention relates to a method of manufacturing vacuum glass, by which spacers configured to provide support so that a space is formed between a base panel and a cover panel are provided on the base panel in an integrated manner, thereby facilitating work, and also relates to vacuum glass which is manufactured by the method of manufacturing double vacuum glass.

BACKGROUND ART

Generally, multilayer glass in which two or more layers of glass are superimposed on each other is applied to windows of buildings in order to ensure insulation. According to such multilayer glass, two or more sheets of glass may be closely coupled to each other while maintaining a state sealed from the outside. Accordingly, vacuum glass is characterized in that it has excellent soundproof, windproof, and thermal insulating effects compared to common general glass made of a single layer of glass because an air layer inside the vacuum glass acts as a medium.

A conventional method of manufacturing vacuum glass will be described as follows:

First, the conventional method of manufacturing vacuum glass includes the edge member seating step S10 of seating a rectangular edge member 11 along the edges of a base panel 10 on the top surface of the base panel 10.

Thereafter, there is included the spacer arrangement step S20 of placing a plurality of spacers 12 on the base panel 10 and arranging the plurality of spacers 12 in lateral and vertical directions. In this case, the spacers and the edge member 11 are made of a glass material having a melting point lower than that of the base panel 10. Each of the diameter and height of the spacers 12 ranges from about 0.3 to 1 mm.

Thereafter, there is included the step S30 of covering the top of the base panel 10 with a cover panel 20 by placing the cover panel 20 over the base panel 10. In this case, the edges of the base panel 10 and the edges of the cover panel 20 are aligned with each other. A vent hole 21 configured to draw air between the base panel 10 and the cover panel 20 is formed through the cover panel 20. The vent hole 21 is formed in the cover panel 20 in advance before the formation of vacuum glass.

After the covering step S30, there is included the heating step S30 of heating the base panel 10. At this heating step S30, the base panel 10 onto which the edge member 11 and the spacers 12 have been fastened is heated to about 500° C. or higher.

After the heating step S40, there is included the vacuum generation step S50 of generating vacuum while drawing air present between the base panel 10 and the cover panel 20 through the vent hole 21 of the cover panel 20. At the vacuum generation step S50, a vacuum generation device is connected to the vent hole 21 of the cover panel 20, and then vacuum is generated at a vacuum pressure equal to or lower than 10-2 torr.

Thereafter, the vacuum generation device is separated from the vent hole 21 and then the vent hole 21 is blocked by inserting a separate plug 22 into the vent hole 21, thereby completing the work of fastening the cover panel 20 onto the base panel 10 at step S60. In this case, the plug 22 is made of an elastic material so that the plug 22 is inserted into the vent hole 21 in a tight-fitting manner in order to completely block the vent hole 21.

The conventional method of manufacturing vacuum glass, which is performed through the above-described process, has the following problems:

First, it is difficult to perform the work of placing the plurality of spacers 12 on the top surface of the base panel 10 and arranging the plurality of spacers 12 in lateral and vertical directions, and thus the time required for the work is excessively long.

Second, when high vacuum (having a pressure equal to or higher than 10-3 torr) is generated during the generation of vacuum, the plug 22 is drawn into the vent hole 21, and thus it is difficult to apply high vacuum.

Third, the attachment between the vent hole and the plug is unstable, and thus it is difficult to implement vacuum.

Fourth, the edge member 11 is attached to the base panel 10 and the cover panel 20 after being melted, and thus edge portions are not clean and are fragile.

Fifth, when the components are heated at a high temperature (ranging from 500 to 550° C.) during fusion bonding, the characteristics of tempered glass are lost, thereby making it impossible to fabricate double vacuum tempered glass.

DISCLOSURE

Technical Problem

The present invention has been conceived to overcome the above-described problems, and an object of the present invention is to provide a method of manufacturing double vacuum glass, by which spacers are formed on a base panel in an integrated manner and the base panel and a cover panel are coupled to each other by a synthetic resin material and a sealer in a gel state, thereby facilitating work and thus reducing required time, and also to provide double vacuum glass which is manufactured by the method of manufacturing double vacuum glass.

Technical Solution

In order to accomplish the above object, the present invention provides a method of manufacturing double vacuum glass, the method including: a formation step of forming a plurality of spacers on a base panel in an integrated manner when the base panel is formed; a strip member formation step of providing strip members located inward from edges of the base panel and edges of a cover panel; a pin member provision step of locating a plurality of pin members on the strip member of the base panel; a pressing step of pressing the pin members, located on the strip member of the base panel, with the cover panel, provided with the strip member, from a location above the base panel; a pin member removal step of removing the pin members provided between the strip member of the base panel and the strip member of the cover panel; a sealing step of sealing a space between the edges of the base panel and the edges of the cover panel outside the strip members by filling the space between the edges of the base panel and the edges of the cover panel with a sealer in a gel state; a vacuum generation step of generating vacuum by discharging air between the base panel and the cover panel that are superimposed on each other; and a setting step of setting the sealer by applying heat to the base panel and the cover panel that are superimposed on each other.

The present invention provides a method of manufacturing double vacuum glass, the method including: a formation step of forming a plurality of spacers on a base panel in an integrated manner when the base panel is formed; a strip member formation step of providing a strip member located inward from edges of the base panel; a pin member provision step of locating a plurality of pin members on the strip member of the base panel; a pin member support step of supporting the pin members by placing a separate strip member on the strip member of the base panel; a pressing step of pressing the separate strip member by covering the base panel with a cover panel from a location above the base panel; a pin member removal step of removing the pin members provided between the strip member of the base panel and the separate strip member; a sealing step of sealing a space between the edges of the base panel and edges of the cover panel outside the strip members by filling the space between the edges of the base panel and the edges of the cover panel with a sealer in a gel state; a vacuum generation step of generating vacuum by discharging air between the base panel and the cover panel that are superimposed on each other; and a setting step of blocking vent holes and also setting the sealer by applying heat to the base panel and the cover panel that are superimposed on each other.

The formation step may include a step of forming a support layer having a predetermined thickness on a surface of an end of each of the spacers formed on the base panel.

The thickness of the strip members that are superimposed on each other when the cover panel is placed on the top of the base panel may be larger than the height of the spacers.

At the vacuum generation step, the vacuum may have a pressure equal to or lower than 10-3 torr.

The pressing step may include a provisional attachment step of provisionally attaching the strip member of the base panel and the strip member of the cover panel to each other by performing heating at a predetermined temperature and performing setting at a room temperature.

The present invention provides vacuum glass, including: a base panel configured to form one side surface of the double vacuum glass, and formed in a plate shape; a cover panel configured to form the other side surface of the double vacuum glass, and formed in a plate shape; spacers configured to space the base panel and the cover panel apart from each other so that a space is formed between the base panel and the cover panel; strip members configured to couple the base panel and the cover panel that are spaced apart from each other by the spacers; and a sealer configured to seal a space between the edges of the base panel and the edges of the cover panel by filling the space between the edges of the base panel and the edges of the cover panel outside the strip members.

The spacers may be formed by forming protrusions having predetermined dimensions by using one of a method of forming the protrusions on the base panel in an integrated manner by using a mold for the base panel, a method of forming the protrusions on one surface of the base panel in an integrated manner by using an etching process, a method of forming the protrusions on one surface of the base panel in an integrated manner by using a surface processing process, and a method of separately forming the protrusions and then arranging the protrusions on one surface of the base panel.

The sealer may be also applied to the side surfaces of the base panel and the side surfaces of the cover panel.

Advantageous Effects

According to the present invention, the spacers are formed on the base panel in an integrated manner and the base panel and the cover panel are coupled to each other by the synthetic resin material and the sealer in a gel state, thereby facilitating the work of forming vacuum glass and thus reducing the time required for the work.

MODE FOR INVENTION

Figure 1:
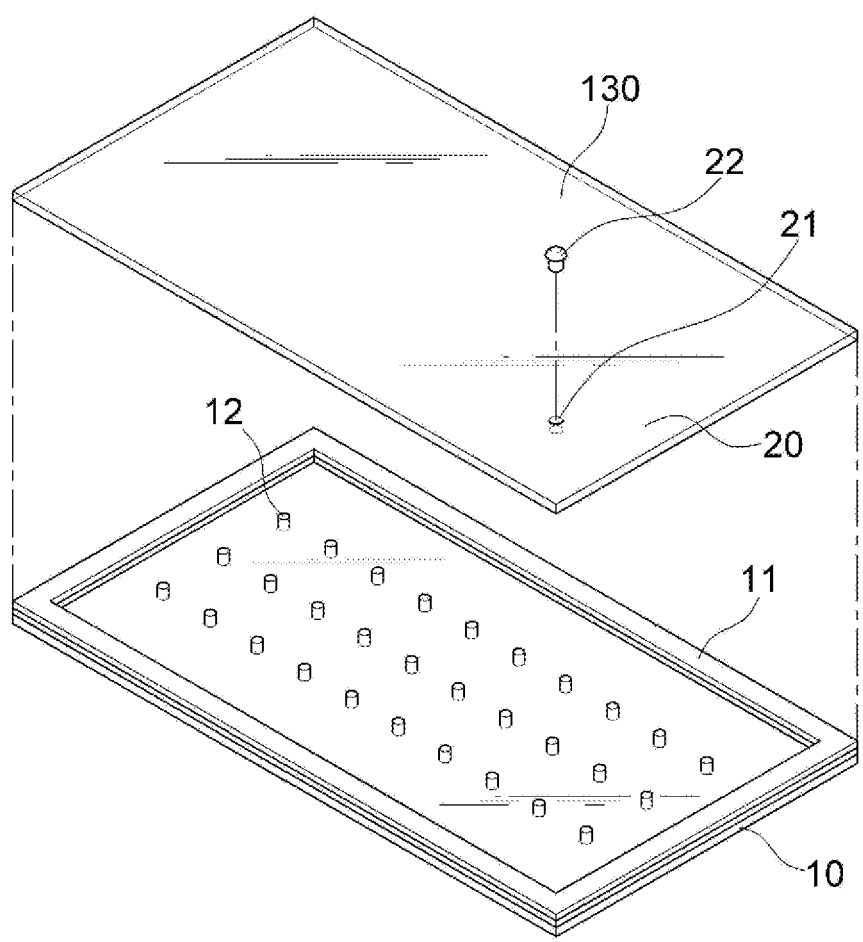
FIG. 1 is an exploded perspective view showing a coupling structure when conventional double vacuum glass is manufactured.
Figure 2:
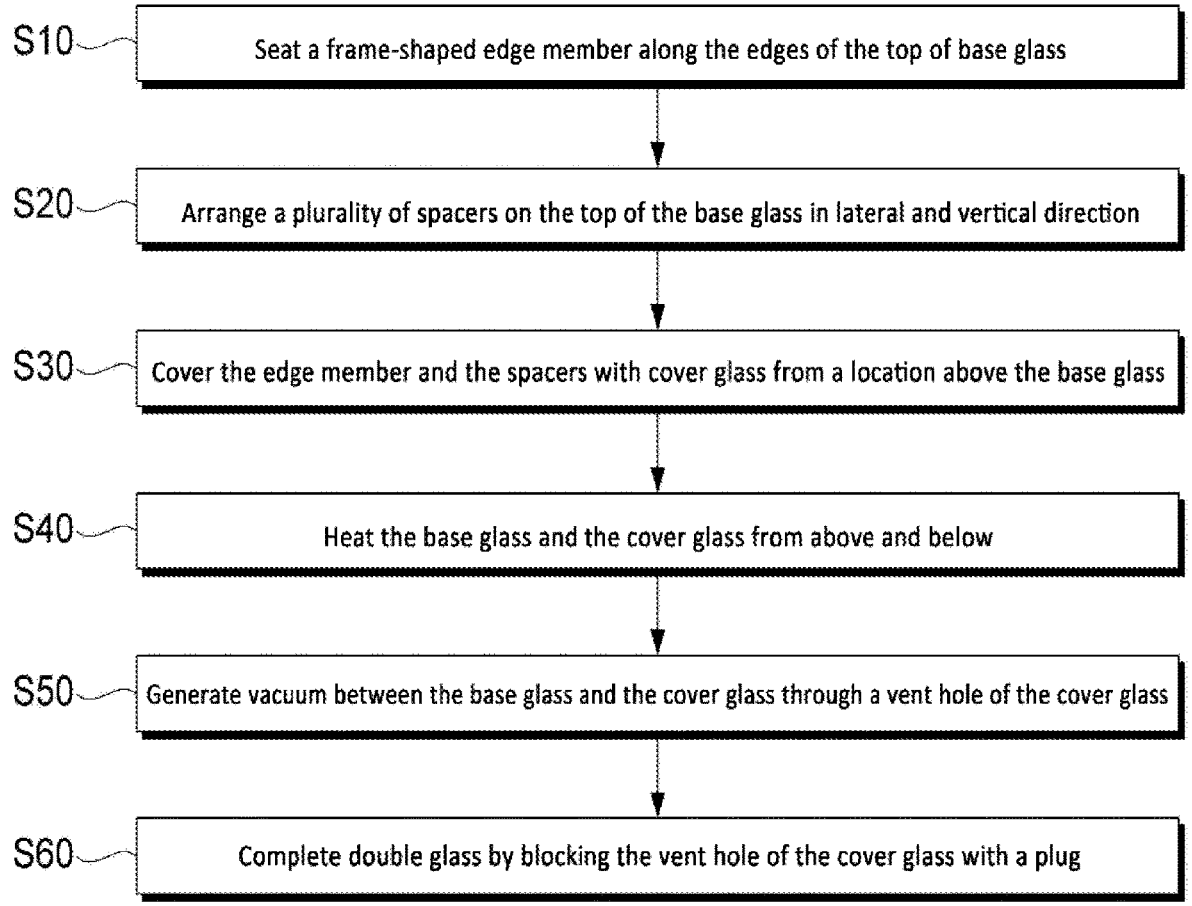
FIG. 2 is a view showing the process of a conventional method of manufacturing double vacuum glass.

The terms or words used in the present specification and the attached claims should not be interpreted as being limited to common or dictionary meanings but should be interpreted as having meanings or concepts suitable for technical spirit of the present invention based on the principle that an inventor may appropriately define the concepts of terms in order to describe his or her invention in the best way.

Furthermore, the embodiments described in the present specification and the configurations shown in the drawings merely correspond to preferred embodiments of the present invention and do not represent the overall technical spirit of the present invention, so that it should be appreciated that there may be various equivalents and modifications that can replace the embodiments and the configurations at the time at which the present application is filed.

Figure 3:
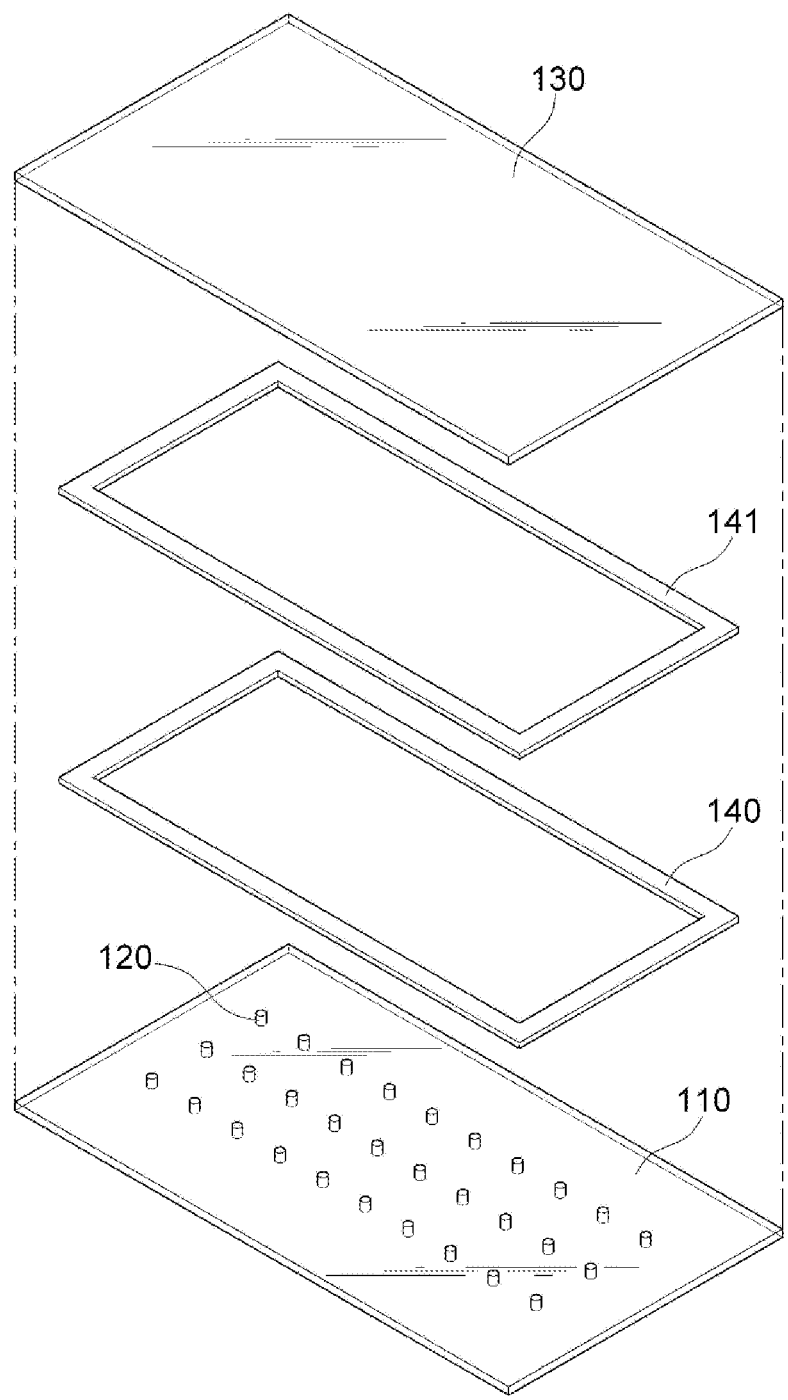
FIG. 3 is an exploded perspective view showing a coupling structure when double vacuum glass according to a first embodiment of the present invention is manufactured.
Figure 4:
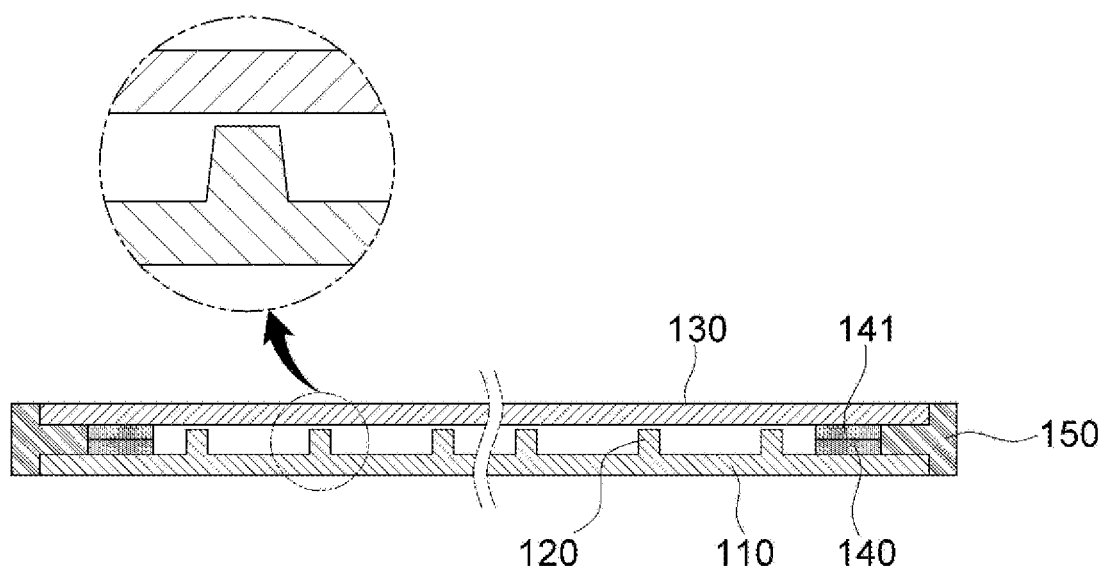
FIG. 4 is a sectional view showing the coupling structure when the double vacuum glass of FIG. 3 is manufactured.
Figure 5A:
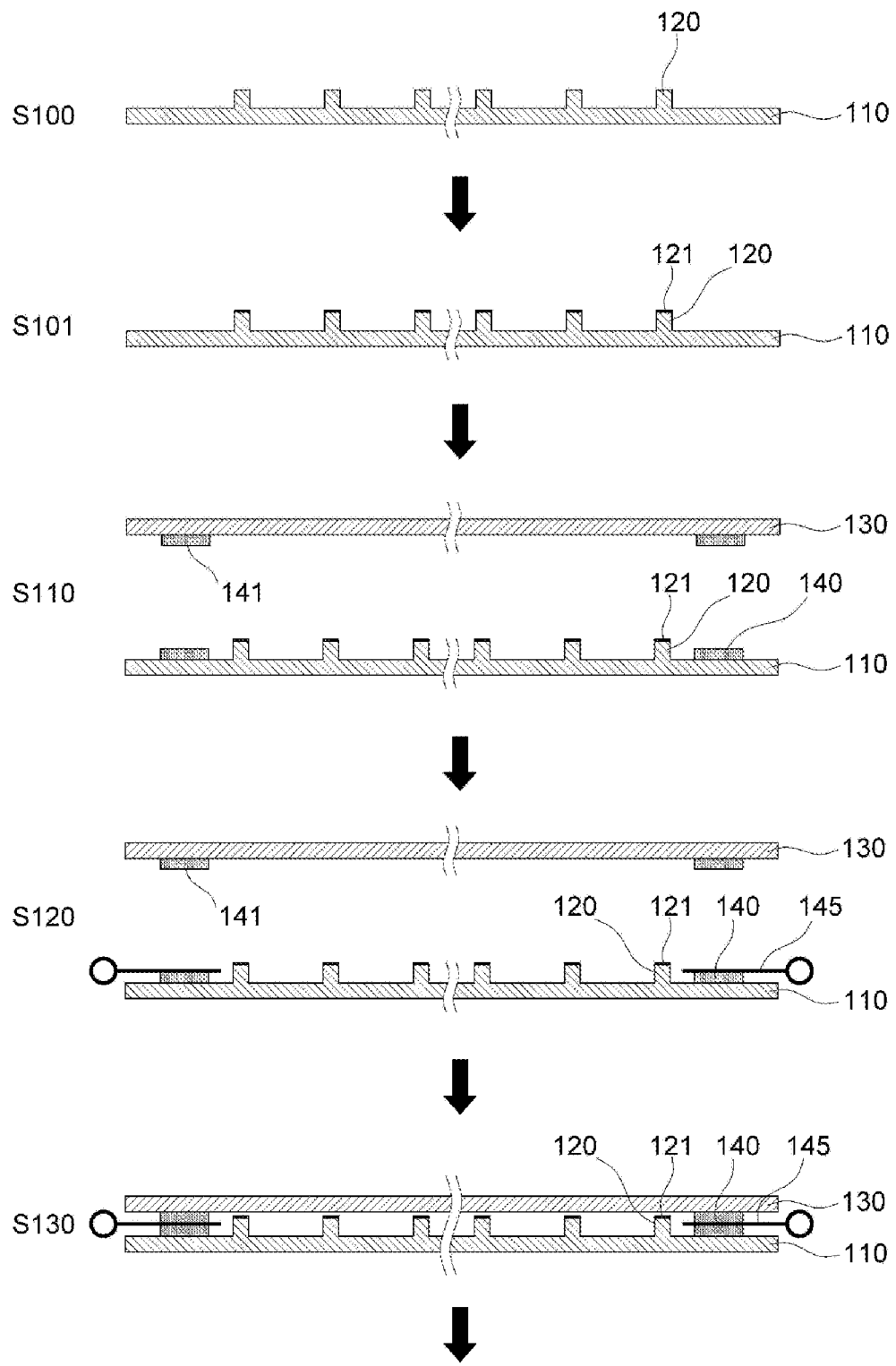
FIGS. 5A and 5B are views showing a method of manufacturing double vacuum glass according to a first embodiment of the present invention.
Figure 5B:
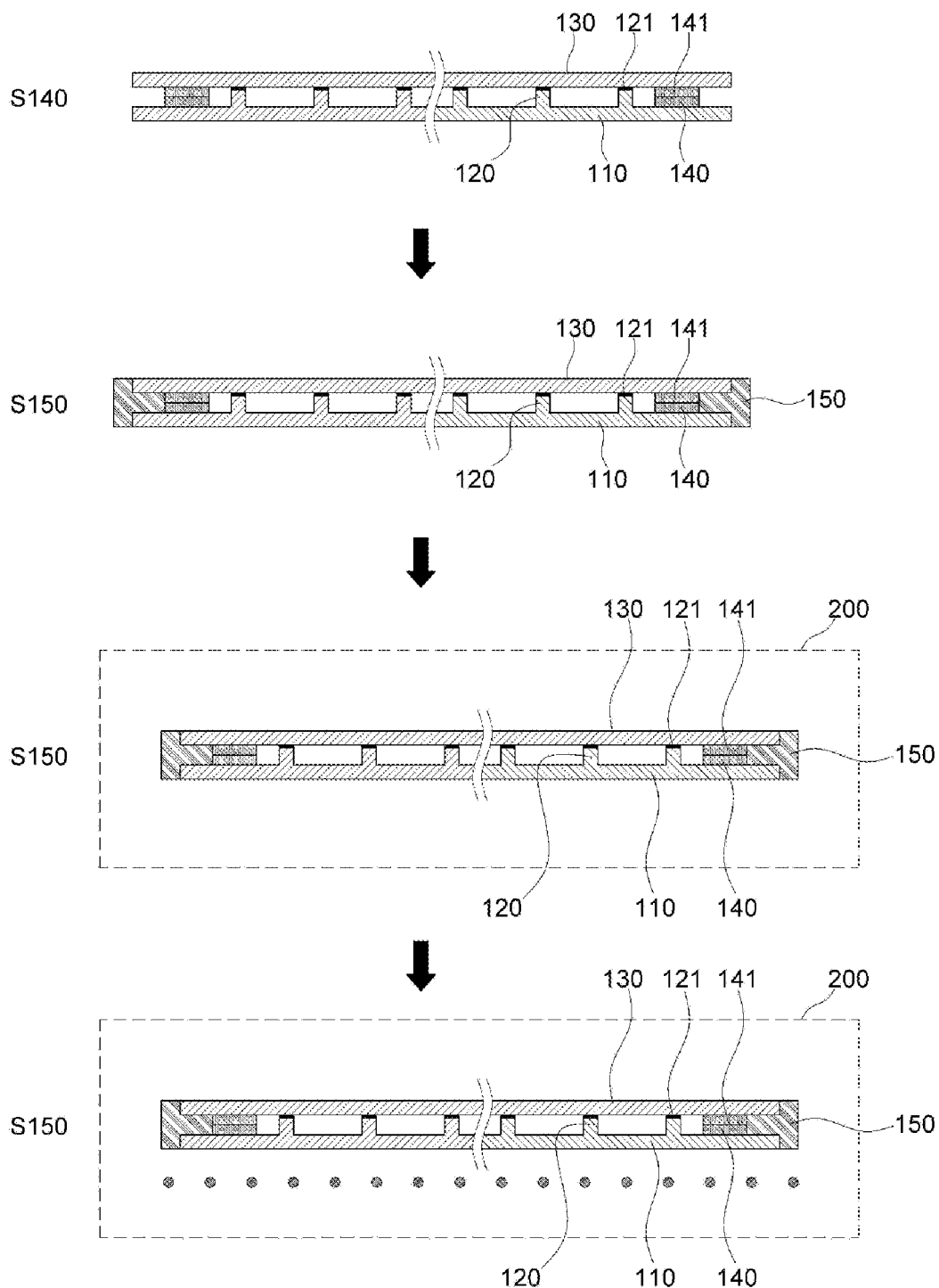
Figure 6:
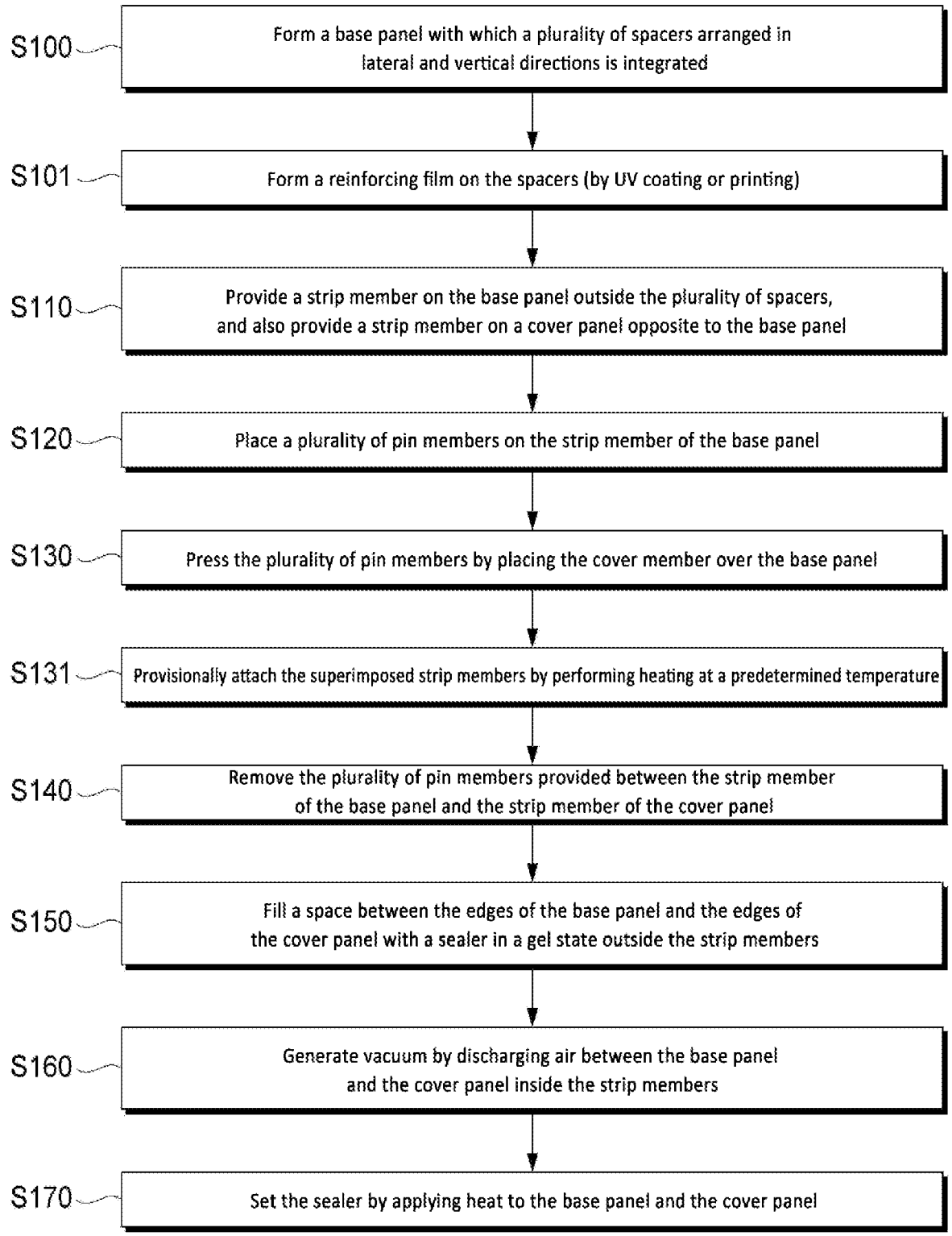
FIG. 6 is a view showing the process of the method of manufacturing double vacuum glass, which is shown in FIGS. 5A and 5B.

FIG. 3 is an exploded perspective view showing a coupling structure when double vacuum glass according to a first embodiment of the present invention is manufactured, FIG. 4 is a sectional view showing the coupling structure when the double vacuum glass of FIG. 3 is manufactured. FIGS. 5A and 5B are views showing a method of manufacturing double vacuum glass according to a first embodiment of the present invention, and FIG. 6 is a view showing the process of the method of manufacturing double vacuum glass, which is shown in FIGS. 5A and 5B.

Referring to FIGS. 3 to 6, first, the method of manufacturing double vacuum glass according to the first embodiment of the present invention includes the formation step S100 of forming a base panel 110 on which spacers 120 are formed.

At the formation step S100, the spacers 120 are formed on one surface (in the drawings, the top surface) of the base panel 110. The spacers 120 may be formed on one surface (the top surface) of the base panel 110 in an integrated manner when the base panel 110 is formed in a mold for a base panel (not shown). In this case, the interval between the spacers 120 may range from about 10 to 30 mm. Each of the thickness and height of the spacers 120 may range from about 0.3 to 2 mm.

The formation step S100 further includes the step S101 of forming a support layer 121 on each of the surfaces of the spacers 120. When the base panel 110 is covered with the cover panel 130, a crack may occur on the surfaces of the spacers 120 that come into contact with the cover panel 130. The support layers 121 function to absorb shock in order to prevent a crack from occurring.

After the formation step S100, there is included the strip member formation step S110 of forming a strip member 140 or 141 along the four-directional edges of each of the base panel 110 and the cover panel 130. The strip member 140 that is formed on the base panel 110 may be provided outside the plurality of spacers 120 that are formed on the base panel 110.

The width of the strip members 140 and 141 may range from about 6 to 10 mm. The strip member 140 or 141 may be located inward by a predetermined distance from the edges of each of the base panel 110 and the cover panel 130. The strip members 140 and 141 may be made of a synthetic resin material, e.g., ethylene-vinyl acetate copolymer (EVA), polyvinyl butyral (PVB), or the like. This EVA is produced through the copolymerization of ethylene and vinyl acetate, i.e., the chemical combination thereof, and has excellent transparency, adhesive force, and elasticity and an excellent low-temperature thermal sealing property. The EVA is soft, strong and cheaper than other polar polymers such as polyurethane, thus making it cost competitive. The EVA is an eco-friendly material that is strong against and absorbs internal impact, that is harder than sponge, and that is harmless to a human body.

The thickness obtained when the strip member 140 of the base panel 110 and the strip member 141 of the cover panel 130 are superimposed on each other may be larger than the height of the spacers 120.

Thereafter, there is provided the pin member provision step S120 of placing and locating a plurality of pin members 145 on the strip member 140 of the base panel 110. In this case, the pin members 145 may form holes configured to discharge air when a vacuum state is generated by drawing air from a space formed between the base panel 110 and the cover panel 130 by the strip members 140 and 141. The outer diameter of the pin members 145 may range from about 0.5 to 3 mm.

After the pin member provision step S120, there is included the pressing step S130 of pressing the pin members located between the strip members by covering the base panel 110 with the cover panel 130. When the base panel 110 is covered with the cover panel 130, the strip member 140 of the base panel 110 and the strip member 141 of the cover panel 130 are superimposed on each other. By doing so, the pin members 145 located on the strip member 141 of the cover panel 130 are pressed by the strip member 141 and the cover panel 130.

The pressing step S130 may further include the provisional attachment step S131 of provisionally attaching the strip member 140 of the base panel 110 and the strip member 141 of the cover panel 130 that are heated at a temperature in the range of about 70 to 120° C., that are set at a room temperature, and that are superimposed on each other. In other words, the vent holes configured such that air moves therethrough may be formed by the pin members 145 that are inserted between the strip members 140 and 141.

Thereafter, there is included the pin member removal step S140 of removing the pin members 145 used to form the vent holes. By doing so, paths configured such that air moves therethrough may be formed in the strip member 110 of the base panel 110 and the strip member 141 of the cover panel 130 where the pin members 145 are located.

After the pin member removal step S140, there is included the sealing step S150 of sealing a space, provided outside the strip members 140 and 141 after the strip member 140 of the base panel 110 and the strip member 141 of the cover panel 130 have been superimposed on each other, by filling the space with a sealer 150 in a gel state. The sealer 150 may be an elastic, flexible material.

After the sealing step S150, there is included the vacuum generation step S160 of generating vacuum inside a vacuum chamber 200 in a state in which the base panel 110 and the cover panel 130 have been superimposed on each other and sealed with the sealer 150 that is not set. At the vacuum generation step S160, as vacuum is generated in the vacuum chamber 200, air may be discharged from a space between the base panel 110 and the cover panel 130, which have been superimposed on each other, outside the vacuum chamber 200. In other words, as the vacuum state between the base panel 110 and the cover panel 130 is made to be the same as the vacuum state of the vacuum chamber 200, the sealer may be compressed.

After the vacuum generation step S160, there is included the setting step S170 of blocking the vent holes by performing heating inside the vacuum chamber 200 at a temperature in the range of 90 to 140° C. and performing setting by performing cooling at a room temperature for a predetermined period, thereby completing a product.

Figure 7:
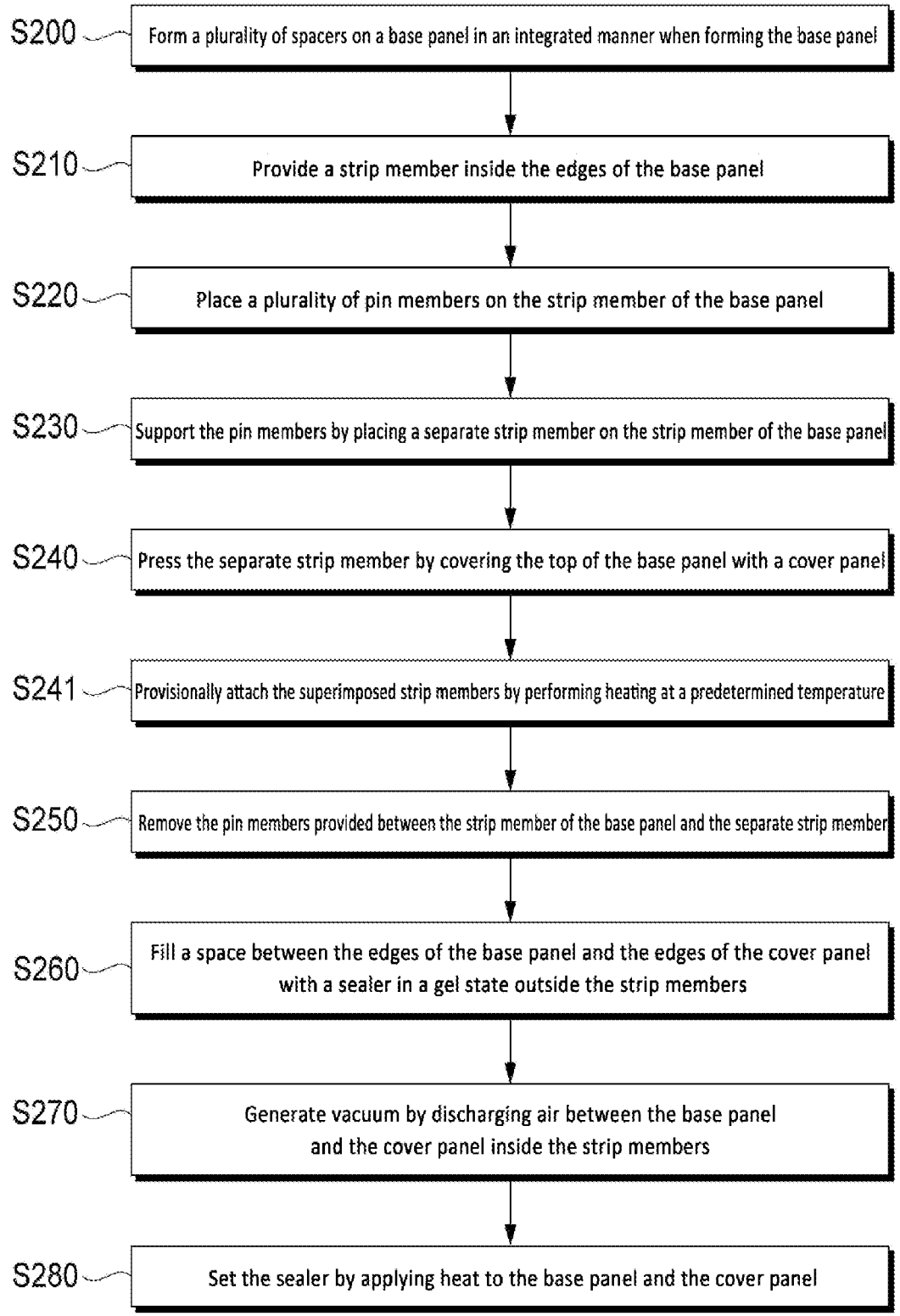
FIG. 7 is a view showing the process of a method of manufacturing double vacuum glass according to a second embodiment of the present invention.

FIG. 7 is a view showing the process of a method of manufacturing vacuum glass according to a second embodiment of the present invention.

As shown in FIG. 7, the method of manufacturing vacuum glass according to the second embodiment of the present invention includes the formation step S200 of forming a base panel 110 on which spacers 120 are formed.

At the formation step S200, the spacers 120 are formed on one surface (in the drawings, the top surface) of the base panel 110. The spacers 120 may be formed on one surface (the top surface) of the base panel 110 in an integrated manner when the base panel 110 is formed in a mold for a base panel (not shown). In this case, the interval between the spacers 120 may range from about 10 to 30 mm. Each of the thickness and height of the spacers 120 may range from about 0.3 to 1.2 mm.

The formation step S200 includes the step of coating the top surface of each of the spacers 120 with a support layer 121. When the base panel 110 is covered with the cover panel 130, a crack may occur on the surfaces of the spacers 120 that come into contact with the cover panel 130. The support layers 121 function to absorb shock in order to prevent a crack from occurring.

After the formation step S200, there is included the strip member formation step S210 of forming a strip member 140 or 141 inside the edges of the base panel 110. In this case, the strip member 140 may be provided outside the plurality of spacers 120 that is formed on the base panel 110. The width of the strip member 140 may range from about 6 to 10 mm. The strip member 140 may be located inward by a predetermined distance from the edges of the base panel 110.

After the strip member formation step S210, there is provided the pin member provision step S220 of locating a plurality of pin members 145 on the strip member 140 formed on the base panel 110. In this case, the pin members 145 may form holes configured to discharge air when a vacuum state is generated by drawing air from a space formed between the base panel 110 and the cover panel 130 by the strip member 140 and a strip member 141. The outer diameter of the pin members 145 may range from about 0.5 to 3 mm.

After the pin member provision step S220, there is included the pin member support step S230 of supporting the pin members 145 by placing a separately formed strip member 141 on the strip member 140 of the base panel 110.

Thereafter, there is included the pressing step S240 of pressing the separate strip member 141 by covering the base panel 110 with the cover panel 130. At the pressing step S240, paths may be formed between the strip member 140 of the base panel 110 and the separate strip member 141 by the pin members 145 by pressing the top of the separate strip member 141 with the load of the cover panel 130. These paths may discharge air present in a space between the base panel 110 and the cover panel 130. The pressing step S240 may further include the provisional attachment step S241 of provisionally attaching the strip member 140 of the base panel 110 and the strip member 141 of the cover panel 130 that are heated at a temperature in the range of about 70 to 120° C., set at room temperature and superimposed on each other. In other words, the vent holes configured such that air moves therethrough may be formed by the pin members 145 that are inserted between the strip members 140 and 141.

After the pressing step S240, there is included the pin member removal step S250 of removing the pin members 145 inserted between the separate strip member 141 and the strip member 140 of the base panel 110. At the pin member removal step S250, pin member-shaped paths may be formed between the separate strip member 141 and the strip member 140 of the base panel 110, between which the pin members 145 are inserted, by removing the pin members 145.

After the pin member removal step S250, there is included the sealing step S260 of sealing a space between the edges of the base panel 110 and the edges of the cover panel 130 outside the strip members 140 and 141 by filling the space with a sealer in a gel state. At the sealing step S260, a space between the base panel 110 and the cover panel 130, which is formed by the strip members 140 and 141 in the inside thereof, may be sealed by filling a space between the edges of the base panel 110 and the cover panel 130, which are superimposed on each other, with the sealer 150 in a gel state.

After the sealing step S260, there is included the vacuum generation step S270 of generating vacuum inside a vacuum chamber 200 in a state in which the base panel 110 and the cover panel 130 have been superimposed on each other and sealed with the sealer 150 that is not set. Air between the base panel 110 and the cover panel 130 is discharged to the outside by generating vacuum inside the vacuum chamber 200 after putting the base panel 110 and the cover panel 130, sealed at the sealing step S260, into the vacuum chamber 200, thereby generating a vacuum state. In this case, the vacuum chamber may be in a high vacuum state at a pressure equal to or lower than 10-3 torr.

After the vacuum generation step S270, there is included the setting step S280 of melting and blocking the vent holes between the strip members through heating inside the vacuum chamber at a temperature in the range of 90 to 140° C. and setting the sealer 150. At the setting step S280, the strip members and the sealer may be changed from a soft material to a hard material by performing cooling at room temperature for a predetermined period.

Referring to FIGS. 5A, 5B, and 6, a vacuum glass 100 that is manufactured by a method of manufacturing vacuum glass according to an embodiment of the present invention includes a base panel 110, spacers 120, a cover panel 130, strip members 140 and 141, and a sealer 150.

The base panel 110 may form one surface (in the drawing, the bottom surface) of the vacuum glass 100. The base panel 110 may be formed as plate-shaped regular glass of a predetermined size.

The spacers 120 are inserted between the base panel 110 and the cover panel 130, and provide support between the base panel 110 and the cover panel 130. In an embodiment of the present invention, the spacers 120 may be integrated with the base panel 110 when the base panel 110 is formed, i.e., when the base panel 110 is formed using a mold for a base panel (not shown). In other words, the spacers 120 may be made of the same material as the base panel 110. In this case, the height of the spacers 120 may range from about 0.3 to 1.2 mm.

The spacers 120 may be formed as separate members, and may be then inserted between the base panel 110 and the cover panel 130. The spacers 120 may be formed in one surface of the plate-shaped base panel 110 of a predetermined thickness by etching the surface of the plate-shaped base panel 110. The spacers 120 may be formed by cutting one surface of the base panel 110 to a predetermined depth. The spacers 120 may be formed by performing cutting in a lateral direction and then performing cutting in a vertical direction.

The cover panel 130 forms the other surface (in the drawing, the top surface) of the vacuum glass 100, and may be made of plate-shaped glass.

A support layer 121 may be formed at the end of each of the spacers 120 that comes into contact with the cover panel 130 when the vacuum glass 100 is completed. The support layers 121 may prevent a crack from occurring on one of the spacers 120 or the cover panel 130 when the ends of the spacers 120 come into contact with the cover panel 130.

Strip members 140 and 141 may form a vacuum space between the base panel 110 and the cover panel 130. The strip members 140 and 141 may be spaced apart inwardly from the edges of the base panel 110 and the edges of the cover panel 130. The thickness of the strip member 140 of the base panel 110 and the strip member 141 of the cover panel 130 that are superimposed on each other may be larger than the height of the spacers 120 that provide support between the base panel 110 and the cover panel 130. The thickness of the strip members 140 and 141 that are superimposed on each other may range from about 1.2 to 1.6 mm.

The sealer 150 may seal a space between the base panel 110 and the cover panel 130 by filling a space between the edges of the base panel 110 and the edges of the cover panel 130 outside the strip members 140 and 141 with the sealer 150. The sealer 150 may be also applied to the side surfaces of the base panel 110 and the cover panel 130. The strength of the coupling between the base panel 110 and the cover panel 130 may be improved in such a manner that the sealer 150 is formed in a "T" shape, as shown in FIG. 4. In other words, the T-shaped sealer 150 increases a support area on the side surfaces of the base panel 110 and the cover panel 130, thereby resisting the pressure for pulling the T-shaped sealer 150 between the base panel 110 and the cover panel 130.

The invention claimed is:

1. A method of manufacturing double vacuum glass, the method comprising:
- a formation step of forming a plurality of spacers on a base panel in an integrated manner when the base panel is formed;
- a strip member formation step of providing strip members located inward from edges of the base panel and edges of a cover panel;
- a pin member provision step of locating a plurality of pin members on the strip member of the base panel;
- a pressing step of pressing the pin members, located on the strip member of the base panel, with the cover panel, provided with the strip member, from a location above the base panel;
- a pin member removal step of removing the pin members provided between the strip member of the base panel and the strip member of the cover panel;
- a sealing step of sealing a space between the edges of the base panel and the edges of the cover panel outside the strip members by filling the space between the edges of the base panel and the edges of the cover panel with a sealer in a gel state;
- a vacuum generation step of generating vacuum by discharging air between the base panel and the cover panel that are superimposed on each other; and
- a setting step of setting the sealer by applying heat to the base panel and the cover panel that are superimposed on each other.

2. A method of manufacturing double vacuum glass, the method comprising:
- a formation step of forming a plurality of spacers on a base panel in an integrated manner when the base panel is formed;
- a strip member formation step of providing a strip member located inward from edges of the base panel;
- a pin member provision step of locating a plurality of pin members on the strip member of the base panel;
- a pin member support step of supporting the pin members by placing a separate strip member on the strip member of the base panel;
- a pressing step of pressing the separate strip member by covering the base panel with a cover panel from a location above the base panel;
- a pin member removal step of removing the pin members provided between the strip member of the base panel and the separate strip member;
- a sealing step of sealing a space between the edges of the base panel and edges of the cover panel outside the strip members by filling the space between the edges of the base panel and the edges of the cover panel with a sealer in a gel state;
- a vacuum generation step of generating vacuum by discharging air between the base panel and the cover panel that are superimposed on each other; and
- a setting step of blocking vent holes and also setting the sealer by applying heat to the base panel and the cover panel that are superimposed on each other.

3. The method of claim 1, wherein the formation step further comprises a step of forming a support layer having a predetermined thickness on a surface of an end of each of the spacers formed on the base panel.

4. The method of claim 1, wherein a thickness of the strip members that are superimposed on each other when the cover panel is placed on the top of the base panel is larger than a height of the spacers.

5. The method of claim 1, wherein the pressing step further comprises a provisional attachment step of provisionally attaching the strip member of the base panel and the strip member of the cover panel to each other by performing heating at a predetermined temperature and performing setting at a room temperature.

6. The method of claim 2, wherein the formation step further comprises a step of forming a support layer having a predetermined thickness on a surface of an end of each of the spacers formed on the base panel.

7. The method of claim 2, wherein a thickness of the strip members that are superimposed on each other when the cover panel is placed on the top of the base panel is larger than a height of the spacers.

8. The method of claim 2, wherein the pressing step further comprises a provisional attachment step of provisionally attaching the strip member of the base panel and the strip member of the cover panel to each other by performing heating at a predetermined temperature and performing setting at a room temperature.

* * * * *